United States Patent [19]

Drury et al.

[11] Patent Number: 4,748,496

[45] Date of Patent: May 31, 1988

[54] TRANSMISSION AND RECEPTION OF TELEVISION SIGNALS TO PRODUCE EXTENDED DEFINITION PICTURES

[75] Inventors: Gordon M. Drury; Michael D. Windram, both of Hampshire, United Kingdom

[73] Assignee: Independent Broadcasting Authority, London, England

[21] Appl. No.: 708,957

[22] PCT Filed: Jul. 9, 1984

[86] PCT No.: PCT/GB84/00244

§ 371 Date: Feb. 27, 1985

§ 102(e) Date: Feb. 27, 1985

[87] PCT Pub. No.: WO85/00492

PCT Pub. Date: Jan. 31, 1985

[30] Foreign Application Priority Data

Jul. 8, 1983 [GB] United Kingdom ................ 8318602

[51] Int. Cl.$^4$ ...................... H04N 11/18; H04N 11/06
[52] U.S. Cl. ......................................... 358/12; 358/14
[58] Field of Search ..................... 358/11, 12, 13, 145

[56] References Cited

U.S. PATENT DOCUMENTS

| | | | |
|---|---|---|---|
| 4,361,852 | 11/1982 | Katzfey | 358/145 |
| 4,394,690 | 7/1983 | Kobayashi | 358/180 |
| 4,551,754 | 11/1985 | Meise et al. | 358/12 X |
| 4,622,577 | 11/1986 | Reitmeier et al. | 358/11 |
| 4,625,230 | 11/1986 | Tan et al. | 358/13 |
| 4,672,425 | 6/1987 | Marie et al. | 358/13 |

FOREIGN PATENT DOCUMENTS

83/00269 1/1983 PCT Int'l Appl. .

OTHER PUBLICATIONS

Wendland, "Enhanced Picture Quality by Timeplex Techniques", *SMPTE Journal*, Oct. 1983, pp. 1034-1035.

Rhodes: "Time Division Multiplex of Time Compressed Chrominance for a Compatible High Definition Television System", *IEEE Transactions on Consumer Electronics*, vol. CE-28, No. 4, Nov. 1982, pp. 592-602.

Documents CCIR Study Groups, Period 1982-1986, Document 10-11S/106-E; Sep. 23, 1983; Draft Report: "Satellite Transmission of Multiplexed Analogue Component (MAC) Television Signals", pp. 1-19.

*Primary Examiner*—James J. Groody
*Attorney, Agent, or Firm*—Watson Cole Grindle & Watson

[57] ABSTRACT

In a method of transmitting and receiving Multiplexed Analog Component (MAC) television signals by producing first chrominance component and luminance component signals representing lines of a television signal capable of reconstruction in a conventional MAC television receiver to produce a first television picture having a first aspect ratio and a first number of lines and wherein the component signals for each line are time-compressed and placed sequentially at times appropriate to allow reconstruction of the television picture but occupying less than the whole line time, the improvement whereby further luminance component and chrominance component signals are generated and added to portions of the television signal not containing the first signals such that the further component signals are capable of being reproduced together with the first signals to produce an extended definition picture with the further component signals not interfering with the picture reproduction from the first chrominance and luminance component signals of a television picture having the first aspect ratio and first number of lines.

4 Claims, 3 Drawing Sheets

TRANSMISSION AND RECEPTION OF TELEVISION SIGNALS TO PRODUCE EXTENDED DEFINITION PICTURES

The present invention relates to an improvement in the Multiplexed Analogue Component (MAC) type of television signal in which chrominance and luminance components are time compressed and are placed sequentially so as to occupy together with the necessary data, sync and clamping signals, a period substantially equal to the conventional line period e.g. approximately 64 μS.

The presently proposed type of MAC signal provides an aspect ratio of approximately 4:3 and provides superior pictures to those available with either existing PAL or SECAM. It is also capable of modification to provide even better pictures.

It is an object of the present invention to add additional information to the MAC signal so as to enable extended definition picutres to be reproduced by a suitable receiver without interfering with the picutre reproduced by a standard MAC receiver.

The present invention proposes to make use of the time allocated to the data burst equivalent to two sound channels for additional video information without affecting the positions in the line interval of the basic chrominance and luminance information for the standard 4:3 aspect ratio picture.

The additional video information can represent additional lines of a television signal or can represent additional information for the existing lines of the signal to alter the aspect ration to produce an extended definition picture.

Features and advantages of the present invention wwill become apparent from the following description of an embodiment thereof given by way of example with reference to the accompanying drawings, in which.

Figure 1:
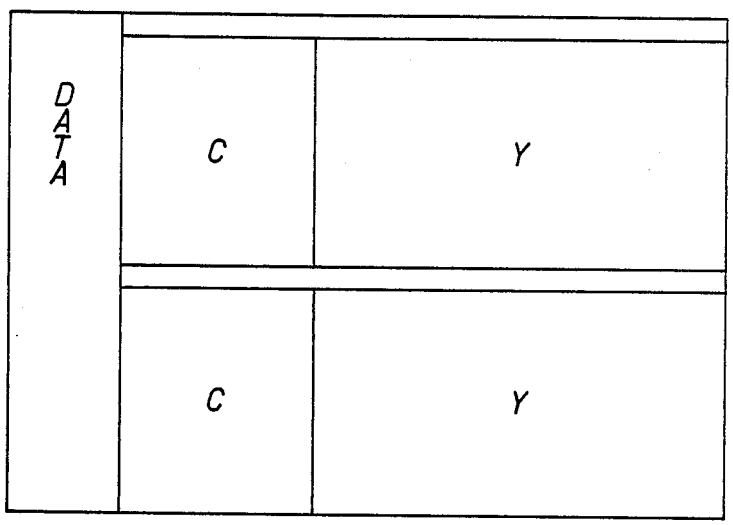
FIG. 1 shows a representation of a frame of a standard MAC signal.

The C-MAC specification conveys a vision signal on 576 lines of a frame, occupying 1296−203=1093 samples of each line. This is illustrated in FIG. 1.

The 203 data samples at the start of each line can convey synchronisation and 8 companded sound channels. For extended definition, we propose to use the time equivalent to two sound channels. In the conventional multiplex, the 8 sound channels are conveyed in 162 packets per frame, made up of 20 packets/frame/-sound channel +2 packets/frame for BI and PI information. In reducing the 2 sound channels, BI and PI will remain essential, but maybe at a lower rate. Two sound channels, therefore require either 41 or, at the most 42 packets per frame. These packets are distributed over 624 lines so that we get the results:

$$\begin{cases} \text{41 packets: 58 bit burst including 8 bit sync, } + \text{ 409 spare bits} \\ \text{42 packets: 59 bit burst including 8 bit sync, } + \text{ 282 spare bits} \end{cases}$$

In order to avoid unnecessary limitations on the data channel, this proposal will assume a need for a 59 bit burst, although this is a matter of detail at this stage.

We therefore have a 4:3 aspect ratio picture conveyed in 1093 samples on 576 lines. In principle, we can have 1296−59=1237 samples on 624 lines, so that with the same information packing density, an aspect ratio of $$4 \times \frac{624}{576} \times \frac{1237}{1093} :3$$

i.e. 4.9:3 is theoretically possible.

This does make assumptions however on transition times but it is clear that a 5:3 aspect ratio can be approached.

Figure 2:
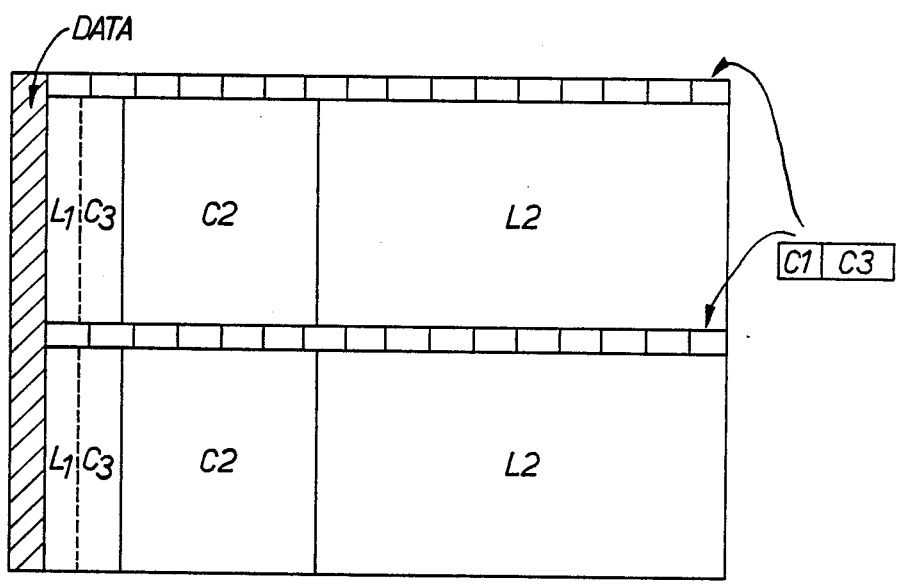
FIG. 2 shows a representation of a frame of a MAC signal according to the present invention.

Our proposal is illustrated in FIG. 2. The main features are:

(i) The position of the 4:3 aspect ratio chrominance and luminance is not moved. This is particularly important when scrambling using rotation methods is considered.

(ii) The 5:3 aspect ratio luminance edges are sent on the same lines as the rest of the 4:3 ratio luminance and chrominance information. The boundary between L1 and L3 (left and right) is defined for each field to permit the 4:3 ratio picture to be the correct part of the 5:3 ratio picture.

(iii) The 5:3 aspect ratio chrominance edges are sent on a number e.g. 18 of inactive lines of each field interval. Each of these lines contains 16 blocks of C1 and C3, each block appropriate to one line of the field. The boundary between C1 and C3 (left and right) is defined as for the luminance signal.

Figure 3:
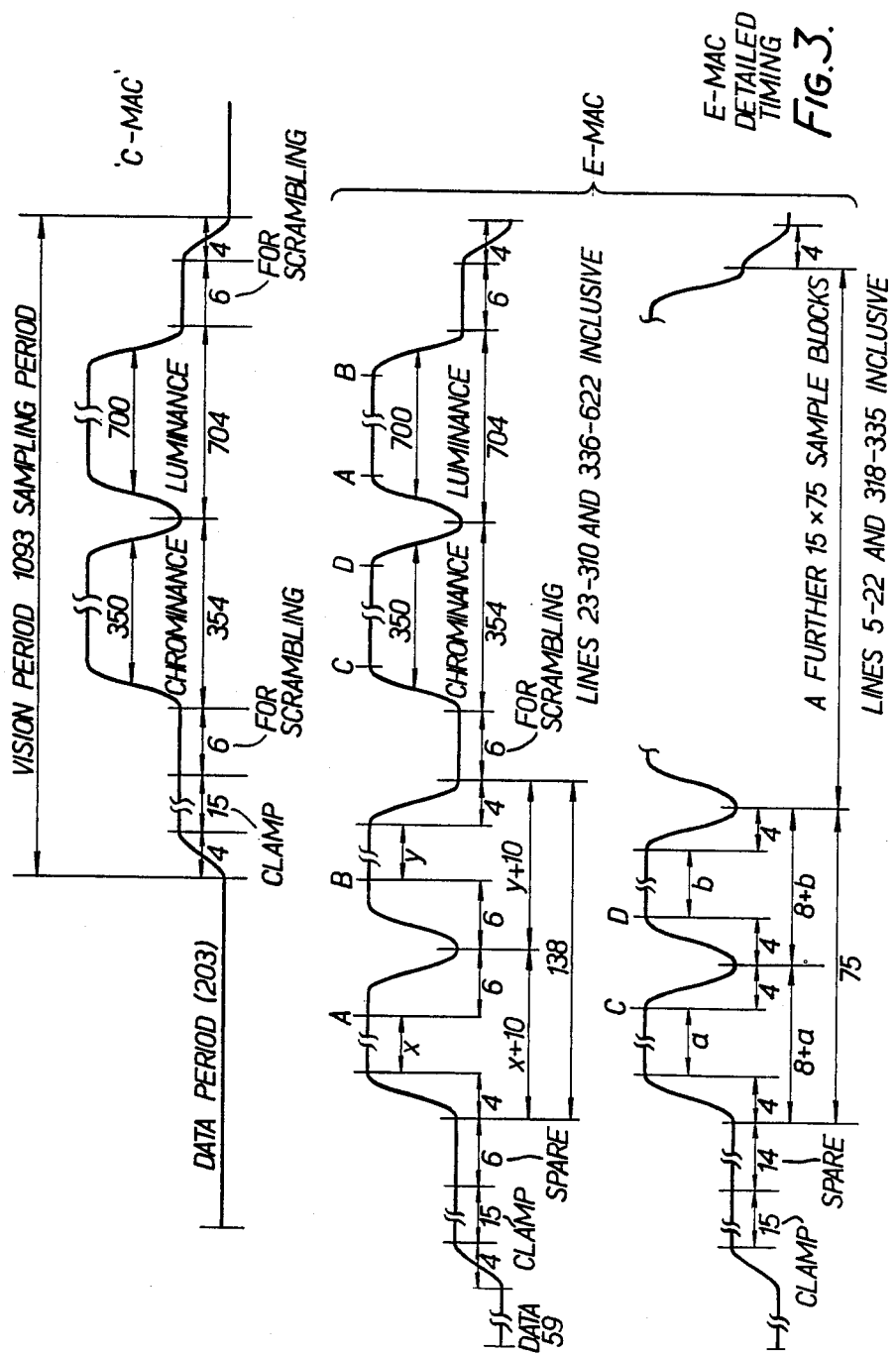
FIG. 3 shows waveforms of the standard MAC signal and the two waveforms necessary for the present invention.

FIG. 3 gives details of one proposed set of numbers and waveforms. In the diagrams, $$\begin{cases} x + y = 118 \\ a + b = 59 \end{cases}$$

so that for extended pictures, the line lengths between ½ voltage points are 818 for luminance and 409 for chrominance, with conventional line lengths of 700 for luminance and 350 for chrominance. This corresponds for the extended pictures to a 4.66:3 aspect ratio and for conventional picutres 3.99:3 aspect ratio.

It is thought that a video tape recorder is initially going to be the most likely source of signals because it appears from first studies that it ought to be possible to modify B and C format machines to cope with the extended format proposed above, in which case the analogue machine will handle 5:3 ratio signals not possible on a 4:3 aspect ratio digital machine.

In defining the transmission channel for extended definition, we could remain with 20.25 MHz sampling in the coder and limit luminance bandwidth to 6 MHz and Chrominance to 3 MHz. Alternatively, we could raise the sampling frequency to say 27 MHz in the coder to permit 7.5 MHz luminance bandwidth and 3.8 MHz chrominance bandwidth if the RF channel can support 11 MHz baseband bandwidth without penalty to the ordinary viewer.

In considering displays, it is considered that the type of signal we propose is of use with several different types—conventional 4:3 ratio/625 line/50 Hz/2:1 interlace small screen up to Large screen 5:3 ratio/1250 lines/50 Hz (or even 100 Hz)/2:1 interlace.

Figure 4:
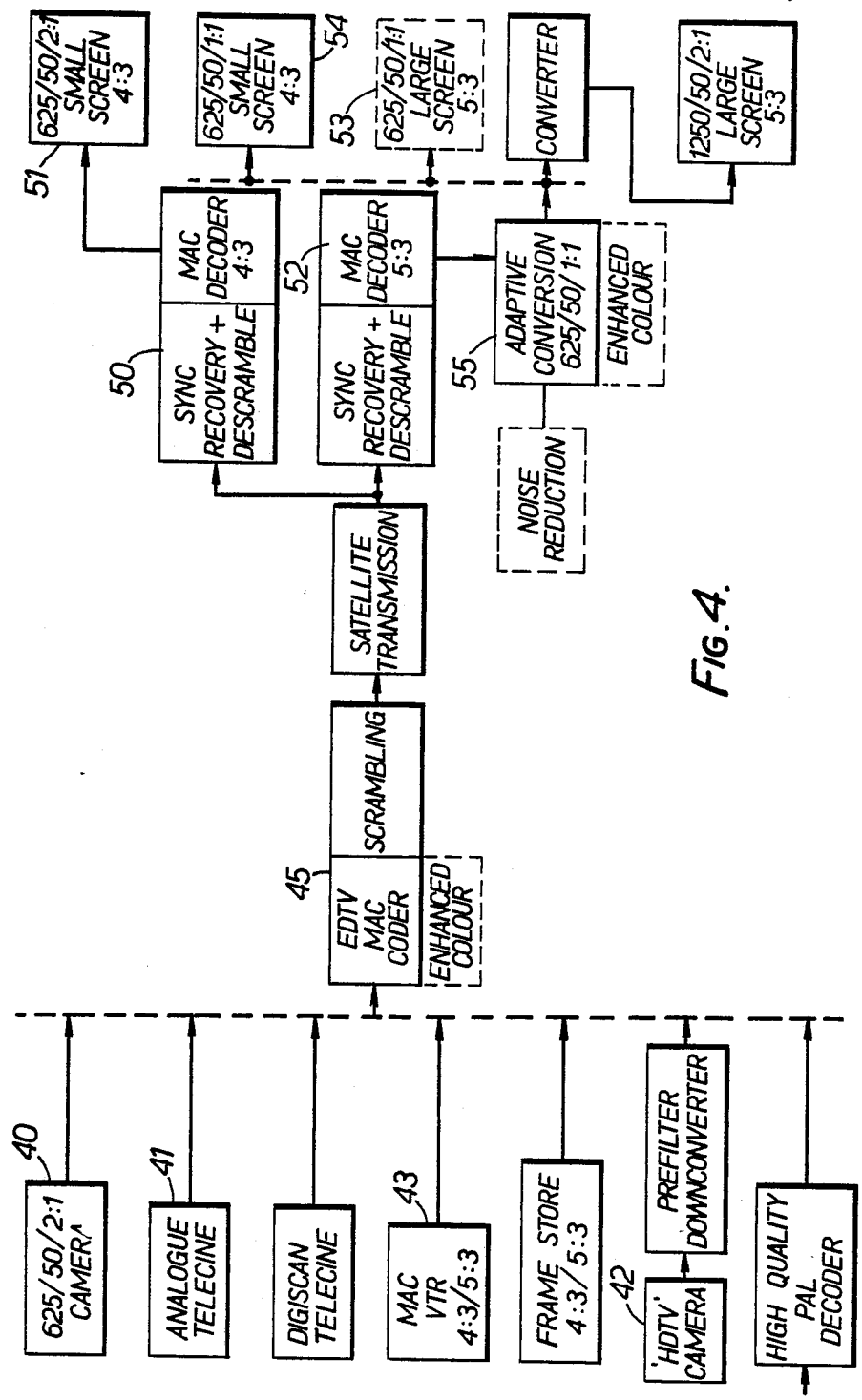
FIG. 4 shows in block diagram terms a transmission/-reception system for the MAC signal shown in FIG. 2.

FIG. 4 indicates how various blocks of activity could be combined in an overall transmission/reception system.

The source of television signals to be transmitted can be either a conventional source such as a conventional camera 40, telecine 41 or it can be a source of high definition signals such as a High Definition Television Camera 42 or a tape recorder 43. If the source is a conventional one, the transmission and reception are conventional for MAC signals. If, however, the source is a high definition one then special encoding is required in order to include those component signals which are additional to the usual component signals in MAC. A coder 45 includes storage for all the component signals with the usual MAC signals being read out from the storage at the usual times and in the usual manner. The extra component signals are read out at times other than the usual MAC timings such that the chrominance signals for successive lines are read out in series during the field blanking interval and are added to signal for transmission in previously blank portions of lines in the field blanking interval.

Similarly, extra luminance signals are added to the signal for transmission either by being included in the field blanking interval but preferably by being added in the time previously occupied by two sound channels.

The timing of the reading out of the extra component signals is derived from the usual MAC clocks and the presence of the extra information can be signalled to a receiver by inclusion of signals in the data information accompanying the video information.

On reception, syncs are recovered and the receiver clocks are generated. If the receiver is a standard MAC receiver, it is incapable of recognising the signal indicative of the extra information and so simply recovers the usual MAC information signals using standard recovery and decoding circuitry 50 for display on a standard screen 51.

If, however, the receiver is capable of displaying the extra information, after sync recovery and clock regeneration, all the chrominance and luminance samples are fed to a decoder 52 which includes additional storage for the extra samples as well as additional clock circuits. Reading out of the stored samples enables assembly of the enhanced definition signals for display e.g. on a 5:3 aspect ratio screen 53 or a conventional 4:3 aspect ratio scree 54. The selection is made by the viewer and by an adaptive conversion circuit 55 which enables either standard MAC or enchanced MAC signals to be selectively displayed.

The above description is given on the bases that a different aspect ratio picture is required as the extended definition picture. It is possible, however, for the additional signals to enable a conventional aspect ratio picture to be provided but with an increased number of lines or for both an increased number of lines and a different aspect ratio to be provided in combination. It is thus possible that luminance information be included as well as chrominance information in the lines in the field blanking interval. Likewise, chrominance information may be included with luminance information on the active lines.

We claim:

1. A method of transmitting a Multiplexed Analogue Component (M.A.C.) television signal, comprising producing first chrominance component and luminance component signals representing lines of a television signal capable of reconstruction in a conventional M.A.C. television receiver to produce a first television picture having a first aspect ratio and a first number of lines, the component signals for each line being time compressed and placed sequentially at times appropriate to allow reconstruction of the television picture but occypying less than the whole line time, the improvement comprising generating further luminance component and chrominance component signals and adding said further chrominance and luminance component signals to portions of the television signal not containing said first signals, the further component signals being capable of reproduction together with the first signals to produce an extended definition picture, the further component signals not interfering with the reproduction from said first chrominance and luminance component signals of a television picture having said first aspect ratio and first number of lines.

2. A method according to claim 1, wherein the further component luminance signals are added to the line signals containing said first chrominance and luminance component signals prior to said first chrominance and luminance component signals.

3. A method according to claim 1, wherein the television signal comprises a number of line signals which do not contain said first chrominance component and luminance component signals, and wherein further chrominance signals are added to one or more of said lines which do not contain said first chrominance component and luminance component signals.

4. A method of receiving and reproducing television signals transmitted according to claim 1, comprising recovering said first chrominance component and luminance component and further component signals from the transmitted line signals, temporarily storing all the component signals, and then selectively reading out stored signals at times depending on whether enhanced pictures or standard pictures are required.

* * * * *